(12) United States Patent
Yang et al.

(10) Patent No.: US 10,320,602 B2
(45) Date of Patent: Jun. 11, 2019

(54) DATA PROCESSING METHOD AND DATA PROCESSING APPARATUS

(71) Applicant: Huawei Technologies Co., Ltd., Shenzhen (CN)

(72) Inventors: Wenbin Yang, Beijing (CN); Xinyuan Wang, Beijing (CN); Tongtong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 15/644,350

(22) Filed: Jul. 7, 2017

(65) Prior Publication Data

US 2017/0310529 A1  Oct. 26, 2017

Related U.S. Application Data

(63) Continuation of application No. PCT/CN2015/072816, filed on Feb. 11, 2015.

(30) Foreign Application Priority Data

Jan. 8, 2015  (WO) ................ PCT/CN2015/070314

(51) Int. Cl.
  *H04L 27/38* (2006.01)
  *H04L 25/493* (2006.01)
  (Continued)

(52) U.S. Cl.
  CPC ........... *H04L 27/38* (2013.01); *H04B 14/023* (2013.01); *H04L 1/0045* (2013.01);
  (Continued)

(58) Field of Classification Search
  CPC ... H04B 14/023; H04L 1/0071; H04L 1/0045; H04L 27/38
  (Continued)

(56) References Cited

U.S. PATENT DOCUMENTS 9,013,976 B2   4/2015  Atlas et al.
2004/0091055 A1  5/2004  Williams
(Continued)

FOREIGN PATENT DOCUMENTS

CN    1335722 A   2/2002
CN  101228755 A   7/2008
(Continued)

OTHER PUBLICATIONS

Machine Translation and Abstract of Chinese Publication No. CN1335722, Feb. 13, 2002, 9 pages.
(Continued)

*Primary Examiner* — Kevin M Burd
(74) *Attorney, Agent, or Firm* — Conley Rose, P.C.

(57) ABSTRACT

A data processing method and an apparatus, where the method includes receiving m data streams using m receive ports respectively, where the m data streams include m×m data units, and the m×m data units form an m-order matrix A, keeping a location of one element in each row in the matrix A unchanged and moving remaining m−1 elements to remaining m−1 rows respectively in order to form an m-order matrix B, where a column number of each element in the remaining m−1 elements in the matrix A before the element is moved equals a column number of the element in the remaining m−1 elements in the matrix B after the element is moved, and sending using m transmit ports, the m×m elements in the matrix B to m different levels of a pulse amplitude modulation (PAM) circuit respectively for performing modulation.

12 Claims, 4 Drawing Sheets

(51) Int. Cl.
  *H04L 1/00* (2006.01)
  *H04B 14/02* (2006.01)
  *H04L 25/49* (2006.01)
(52) U.S. Cl.
  CPC .......... *H04L 1/0071* (2013.01); *H04L 25/493* (2013.01); *H04L 25/4917* (2013.01)
(58) Field of Classification Search
  USPC ........................................................ 375/340
  See application file for complete search history.

(56) References Cited

U.S. PATENT DOCUMENTS

| | | | |
|---|---|---|---|
| 2006/0228116 | A1* | 10/2006 | Bontu ................ H04B 10/2572 398/152 |
| 2011/0007629 | A1 | 1/2011 | Atlas et al. |
| 2012/0257896 | A1* | 10/2012 | Djordjevic ........... H04B 10/548 398/65 |

FOREIGN PATENT DOCUMENTS

| | | |
|---|---|---|
| CN | 101442319 A | 5/2009 |
| CN | 102984110 A | 3/2013 |
| CN | 103718490 A | 4/2014 |
| JP | 2006237814 A | 9/2006 |

OTHER PUBLICATIONS

Machine Translation and Abstract of Chinese Publication No. CN101228755, Jul. 23, 2008, 14 pages.
Machine Translation and Abstract of Chinese Publication No. CN101442319, May 27, 2009, 9 pages.
Machine Translation and Abstract of Chinese Publication No. CN102984110, Mar. 20, 2013, 7 pages.
Machine Translation and Abstract of Chinese Publication No. CN103718490, Apr. 9, 2014, 11 pages.
Machine Translation and Abstract of Japanese Publication No. JP2006237814, Sep. 7, 2006, 11 pages.
"Amendment 2: Physical Layer Specifications and Management Parameters for 100 Gb/s Operation Over Backplanes and Copper Cables," IEEE Std 802.3bj, Jun. 12, 2014, 368 pages.
"Part 3: Carrier Sense Multiple Access with Collision Detection (CSMA/CD) Access Method and Physical Layer Specifications," IEEE P802.3ba D3.2, Mar. 24, 2010, 461 pages.
"Draft Standard for Ethernet Amendment: Physical Layer Specifications and Management Parameters for 40 Gb/s and 100 Gb/s Operation Over Fiber Optic Cables," IEEE P802.3bm/D2.1, Feb. 7, 2014, 180 pages.
"Draft Standard for Ethernet Amendment: Media Access Control Parameters, Physical Layers and Management Parameters for 400 Gb/s Operation," IEEE P802.3bs/D1.1, Nov. 27, 2015, 265 pages.
"Draft Standard for Ethernet Amendment: Media Access Control Parameters, Physical Layers and Management Parameters for 200 Gb/s and 400 Gb/s Operation," IEEE P802.3bs/D2.1, Oct. 6, 2016, 384 pages.
"Draft Standard for Ethernet Amendment: Media Access Control Parameters, Physical Layers and Management Parameters for 200 Gb/s and 400 Gb/s Operation," IEEE P802.3bs/D3.0, Jan. 10, 2017, 387 pages.
Hossain, J., et al., "Constellation and Interleaver Design for BICM," XP032118835, Global Telecommunications Conference, Dec. 5, 2011, 6 pages.
Foreign Communication From A Counterpart Application, European Application No. 15876507.3, Extended European Search Report dated Sep. 22, 2017, 11 pages.
Foreign Communication From A Counterpart Application, PCT Application No. PCT/CN2015/070314, International Search Report dated Jun. 3, 2015, 4 pages.
Foreign Communication From A Counterpart Application, PCT Application No. PCT/CN2015/072816, English Translation of International Search Report dated Oct. 8, 2015, 2 pages.
Foreign Communication From A Counterpart Application, PCT Application No. PCT/CN2015/072816, English Translation of Written Opinion dated Oct. 8, 2015, 5 pages.

* cited by examiner

DATA PROCESSING METHOD AND DATA PROCESSING APPARATUS

CROSS-REFERENCE TO RELATED APPLICATIONS

This application is a continuation of International Patent Application No. PCT/CN2015/072816 filed on Feb. 11, 2015, which claims priority to International Patent Application No. PCT/CN2015/070314 filed on Jan. 8, 2015. The disclosures of the aforementioned applications are hereby incorporated by reference in their entireties.

TECHNICAL FIELD

The present disclosure relates to the field of mobile communications, and in particular, to a data processing method and a data processing apparatus.

BACKGROUND

A modulation technology commonly used in Ethernet is pulse amplitude modulation (PAM). The following uses a PAM-4 circuit as an example to describe a working procedure of a PAM circuit. The PAM-4 circuit receives data sent by a link 0 and data sent by a link 1, modulates the data sent by the link 0 to a level corresponding to $2^0$, and modulates the data sent by the link 1 to a level corresponding to $2^1$. At a time, data sent by each link is 0 or 1. Therefore, the PAM-4 circuit separately modulates four types of data 00, 01, 10, and 11 sent by the link 0 and the link 1 in order to obtain pulse signals whose amplitudes are 0, 1, 2, and 3 respectively. The PAM-4 circuit sends an obtained pulse signal to a receive end. After receiving the pulse signal, the receive end demodulates the received pulse signal in order to obtain one type of data 00, 01, 10, or 11, and sends the data obtained by demodulation to two forward error correction (FEC) circuits using two links respectively.

However, a bit error may occur in a transmission process in which a pulse signal is transmitted to a receive end. In addition, bit error rates corresponding to data transmitted on different links may be different. Therefore, the receive end needs to configure different FEC circuits for different links in order to separately perform error correction on data transmitted on the different links. For example, for data with a relatively high bit error rate, a relatively complex FEC circuit is used to perform error correction. For data with a relatively low bit error rate, a relatively simple FEC circuit is used to perform error correction. As a result, implementation complexity is relatively high.

SUMMARY

Embodiments of the present disclosure provide a data processing method, in which multiple FEC circuits of a same specification may be used to perform error correction on multiple received data streams respectively, thereby helping to reduce implementation complexity.

According to a first aspect, a data processing method is provided, including receiving, by an encoding circuit, m data streams using m receive ports respectively, where m is an integer greater than 1, the m receive ports are in a one-to-one correspondence with the m data streams, and the m data streams include m×m data units, where each data stream of the m data streams includes m data units, the m×m data units form an m-order matrix A, the m×m data units are m×m elements in the matrix A, m 1×m matrices in the matrix A are in a one-to-one correspondence with the m data streams, m elements located in a same m×1 matrix of m m×1 matrices in the matrix A are received by the encoding circuit at a same time, and among m elements located in a same 1×m matrix of the m 1×m matrices in the matrix A, an element located on a right side is received by the encoding circuit earlier than an element located on a left side, keeping, by the encoding circuit, a location of one element in each row in the matrix A unchanged and moving remaining m−1 elements to remaining m−1 rows respectively in order to form an m-order matrix B, where a column number of each element in the remaining m−1 elements in the matrix A before the element is moved equals a column number of the element in the remaining m−1 elements in the matrix B after the element is moved, and the m×m elements in the matrix A are in a one-to-one correspondence with m×m elements in the matrix B, and sending, by the encoding circuit using m transmit ports, the m×m elements in the matrix B to m different levels of a PAM circuit respectively for performing modulation, where m 1×m matrices in the matrix B are in a one-to-one correspondence with the m different levels of the PAM circuit, m elements located in a same m×1 matrix of m m×1 matrices in the matrix B are sent by the encoding circuit at a same time, and among m elements located in a same 1×m matrix of the m 1×m matrices in the matrix B, an element located on a right side is sent by the encoding circuit earlier than an element located on a left side.

With reference to the first aspect, in a first implementation manner of the first aspect, the m×m elements in the matrix A are denoted by $a_{ij}$, the m×m elements in the matrix B are denoted by $b_{ij}$, i=1, ..., m, and j=1, ..., m, where $b_{ij}=a_{xj}$, and a value of x complies with the constraints, that x=i+k when i+k≤m, and x=i+k−m when i+k>m, where k is an integer greater than or equal to 0 and less than m, and m elements in a same row in the matrix B correspond to different k values respectively, or x=i−k when i−k>0, and x=i−k+m when i−k≤0, where k is an integer greater than or equal to 0 and less than m, and m elements in a same row in the matrix B correspond to different k values respectively.

With reference to the first implementation manner of the first aspect, in a second implementation manner of the first aspect, a difference between k values corresponding to two adjacent elements of elements in each row in the matrix B is 1.

With reference to the first aspect or either one of the foregoing implementation manners of the first aspect, in a third implementation manner of the first aspect, the method further includes receiving, by the encoding circuit, m data units using the m receive ports respectively, where the received m data units are in a one-to-one correspondence with the m receive ports, the received m data units are received by the encoding circuit at a same time, and the time at which the encoding circuit receives the received m data units is different from a time at which the encoding circuit receives m data units in any m×1 matrix of the m m×1 matrices in the matrix A, and sending, by the encoding circuit using the m transmit ports, the received m data units to the m different levels of the PAM circuit respectively for performing modulation, where the received m data units are in a one-to-one correspondence with the m different levels.

According to a second aspect, a data processing method is provided, including receiving, by a decoding circuit, m demodulated data streams using m receive ports respectively, where m is an integer greater than 1, the m receive ports are in a one-to-one correspondence with the m data streams, and the m data streams include m×m data units, where each data stream of the m data streams includes m data units, the m×m data units form an m-order matrix C, the m×m data units are m×m elements in the matrix C, m 1×m matrices in the matrix C are in a one-to-one correspondence with the m data streams, m elements located in a same m×1 matrix of m m×1 matrices in the matrix C are received by the decoding circuit at a same time, and among m elements located in a same 1×m matrix of the m 1×m matrices in the matrix C, an element located on a right side is received by the decoding circuit earlier than an element located on a left side, keeping, by the decoding circuit, a location of one element in each row in the matrix C unchanged and moving remaining m−1 elements to remaining m−1 rows respectively so as to form an m-order matrix D, where a column number of each element in the remaining m−1 elements in the matrix C before the element is moved equals a column number of the element in the remaining m−1 elements in the matrix D after the element is moved, and the m×m elements in the matrix C are in a one-to-one correspondence with m×m elements in the matrix D, and sending, by the decoding circuit, the m×m elements in the matrix D using m transmit ports, where m elements located in a same m×1 matrix of m m×1 matrices in the matrix D are sent by the decoding circuit at a same time, and among m elements located in a same 1×m matrix of m 1×m matrices in the matrix D, an element located on a right side is sent by the encoding circuit earlier than an element located on a left side.

With reference to the second aspect, in a first implementation manner of the second aspect, the m×m elements in the matrix C are denoted by $c_{ij}$, the m×m elements in the matrix D are denoted by $d_{ij}$, i=1, m, and j=1, . . . , m, where $d_{ij}=c_{yj}$, and a value of y is y=i−k when i−k>0, and y=i−k+m when i−k≤0, where k is an integer greater than or equal to 0 and less than m, and m elements in a same row in the matrix D correspond to different k values respectively, or y=i+k when i+k≤m, and y=i+k−m when i+k>m, where k is an integer greater than or equal to 0 and less than m, and m elements in a same row in the matrix D correspond to different k values respectively.

With reference to the first implementation manner of the second aspect, in a second implementation manner of the second aspect, a difference between k values corresponding to two adjacent elements of elements in each row in the matrix D is 1.

With reference to the second aspect or either one of the foregoing implementation manners of the second aspect, in a third implementation manner of the second aspect, the method further includes receiving, by the decoding circuit, m demodulated data units using the m receive ports respectively, where the received and demodulated m data units are in a one-to-one correspondence with the m receive ports, the received and demodulated m data units are received by the decoding circuit at a same time, and the time at which the decoding circuit receives the received and demodulated m data units is different from a time at which the decoding circuit receives m data units in any m×1 matrix of the m m×1 matrices in the matrix C, and sending, by the decoding circuit, the received and demodulated m data units using the m transmit ports respectively, where the received and demodulated m data units are in a one-to-one correspondence with the m transmit ports.

According to a third aspect, a data processing apparatus is provided, including a receiving unit configured to receive m data streams using m receive ports respectively, where m is an integer greater than 1, the m receive ports are in a one-to-one correspondence with the m data streams, and the m data streams include m×m data units, where each data stream of the m data streams includes m data units, the m×m data units form an m-order matrix A, the m×m data units are m×m elements in the matrix A, m 1×m matrices in the matrix A are in a one-to-one correspondence with the m data streams, m elements located in a same m×1 matrix of m m×1 matrices in the matrix A are received by the receiving unit at a same time, and among m elements located in a same 1×m matrix of the m 1×m matrices in the matrix A, an element located on a right side is received by the receiving unit earlier than an element located on a left side, an encoding unit configured to keep a location of one element in each row in the matrix A received by the receiving unit unchanged and move remaining m−1 elements to remaining m−1 rows respectively so as to form an m-order matrix B, where a column number of each element in the remaining m−1 elements in the matrix A before the element is moved equals a column number of the element in the remaining m−1 elements in the matrix B after the element is moved, and the m×m elements in the matrix A are in a one-to-one correspondence with m×m elements in the matrix B, and a sending unit configured to send, using m transmit ports, the m×m elements in the matrix B generated by the encoding unit to m different levels of a PAM circuit respectively for performing modulation, where m 1×m matrices in the matrix B are in a one-to-one correspondence with the m different levels of the PAM circuit, m elements located in a same m×1 matrix of m m×1 matrices in the matrix B are sent by the sending unit at a same time, and among m elements located in a same 1×m matrix of the m 1×m matrices in the matrix B, an element located on a right side is sent by the sending unit earlier than an element located on a left side.

With reference to the third aspect, in a first implementation manner of the third aspect, the m×m elements in the matrix A are denoted by $a_{ij}$, the m×m elements in the matrix B are denoted by $b_{ij}$, i=1, . . . , m, and j=1, . . . , m, where $b_{ij}=a_{xj}$, and a value of x is x=i+k when i+k≤m, and x=i+k−m when i+k>m, where k is an integer greater than or equal to 0 and less than m, and m elements in a same row in the matrix B correspond to different k values respectively, or x=i−k when i−k>0, and x=i−k+m when i−k≤0, where k is an integer greater than or equal to 0 and less than m, and m elements in a same row in the matrix B correspond to different k values respectively.

With reference to the first implementation manner of the third aspect, in a second implementation manner of the third aspect, a difference between k values corresponding to two adjacent elements of elements in each row in the matrix B is 1.

With reference to the third aspect or either one of the foregoing implementation manners of the third aspect, in a third implementation manner of the third aspect, the receiving unit is further configured to receive m data units using the m receive ports respectively, where the received m data units are in a one-to-one correspondence with the m receive ports, the received m data units are received by the receiving unit at a same time, and the time at which the receiving unit receives the received m data units is different from a time at which the receiving unit receives m data units in any m×1 matrix of the m m×1 matrices in the matrix A, and the sending unit is further configured to send, using the m transmit ports, the received m data units to the m different levels of the PAM circuit respectively for performing modulation, where the received m data units are in a one-to-one correspondence with the m different levels.

According to a fourth aspect, a data processing apparatus is provided, including a receiving unit configured to receive m demodulated data streams using m receive ports respectively, where m is an integer greater than 1, the m receive ports are in a one-to-one correspondence with the m data streams, and the m data streams include m×m data units, where each data stream of the m data streams includes m data units, the m×m data units form an m-order matrix C, the m×m data units are m×m elements in the matrix C, m 1×m matrices in the matrix C are in a one-to-one correspondence with the m data streams, m elements located in a same m×1 matrix of m m×1 matrices in the matrix C are received by the receiving unit at a same time, and among m elements located in a same 1×m matrix of the m 1×m matrices in the matrix C, an element located on a right side is received by the receiving unit earlier than an element located on a left side, a decoding unit configured to keep a location of one element in each row in the matrix C received by the receiving unit unchanged and move remaining m−1 elements to remaining m−1 rows respectively so as to form an m-order matrix D, where a column number of each element in the remaining m−1 elements in the matrix C before the element is moved equals a column number of the element in the remaining m−1 elements in the matrix D after the element is moved, and the m×m elements in the matrix C are in a one-to-one correspondence with m×m elements in the matrix D, and a sending unit configured to send, using m transmit ports, the m×m elements in the matrix D generated by the decoding unit, where m elements located in a same m×1 matrix of m m×1 matrices in the matrix D are sent by the sending unit at a same time, and among m elements located in a same 1×m matrix of m 1×m matrices in the matrix D, an element located on a right side is sent by the sending unit earlier than an element located on a left side.

With reference to the fourth aspect, in a first implementation manner of the fourth aspect, the m×m elements in the matrix C are denoted by , the m×m elements in the matrix D are denoted by $d_{ij}$, i=1, . . . , m, and j=1, m, where $d_{ij}=c_{yj}$, an$_d$ a value of y is y=i−k when i−k>0, and y=i−k+m when i−k≤0, where k is an integer greater than or equal to 0 and less than m, and m elements in a same row in the matrix D correspond to different k values respectively, or y=i+k when i+k≤m, and y=i+k−m when i+k>m, where k is an integer greater than or equal to 0 and less than m, and m elements in a same row in the matrix D correspond to different k values respectively.

With reference to the first implementation manner of the fourth aspect, in a second implementation manner of the fourth aspect, a difference between k values corresponding to two adjacent elements of elements in each row in the matrix D is 1.

With reference to the fourth aspect or either one of the foregoing implementation manners of the fourth aspect, in a third implementation manner of the fourth aspect, the receiving unit is further configured to receive m demodulated data units using the m receive ports respectively, where the received and demodulated m data units are in a one-to-one correspondence with the m receive ports, the received and demodulated m data units are received by the receiving unit at a same time, and the time at which the receiving unit receives the received and demodulated m data units is different from a time at which the receiving unit receives m data units in any m×1 matrix of the m m×1 matrices in the matrix C, and the sending unit is further configured to send the received and demodulated m data units using the m transmit ports respectively, where the received and demodulated m data units are in a one-to-one correspondence with the m transmit ports.

It can be seen from the foregoing technical solutions that, the embodiments of the present disclosure have the following advantages In other approaches, bit error rates that occur in different links are different. In the embodiments of the present disclosure, before data streams in m links are sent to m different levels of a PAM circuit for performing modulation, an m-order matrix A formed by m data units on each link of the m links is coded using an encoding circuit such that m data units that are originally located in a same link and are to enter a same level of the PAM circuit for performing modulation are transmitted on the m links respectively and enter the m different levels of the PAM circuit respectively for performing modulation. After a pulse signal sent by the PAM circuit is demodulated and decoded by a receive end, in data transmitted on the m links, a bit error rate corresponding to data transmitted on each link is the same or approximately the same. Therefore, a same FEC circuit may be configured for different links, which helps to reduce implementation complexity.

DESCRIPTION OF EMBODIMENTS

Figure 1:
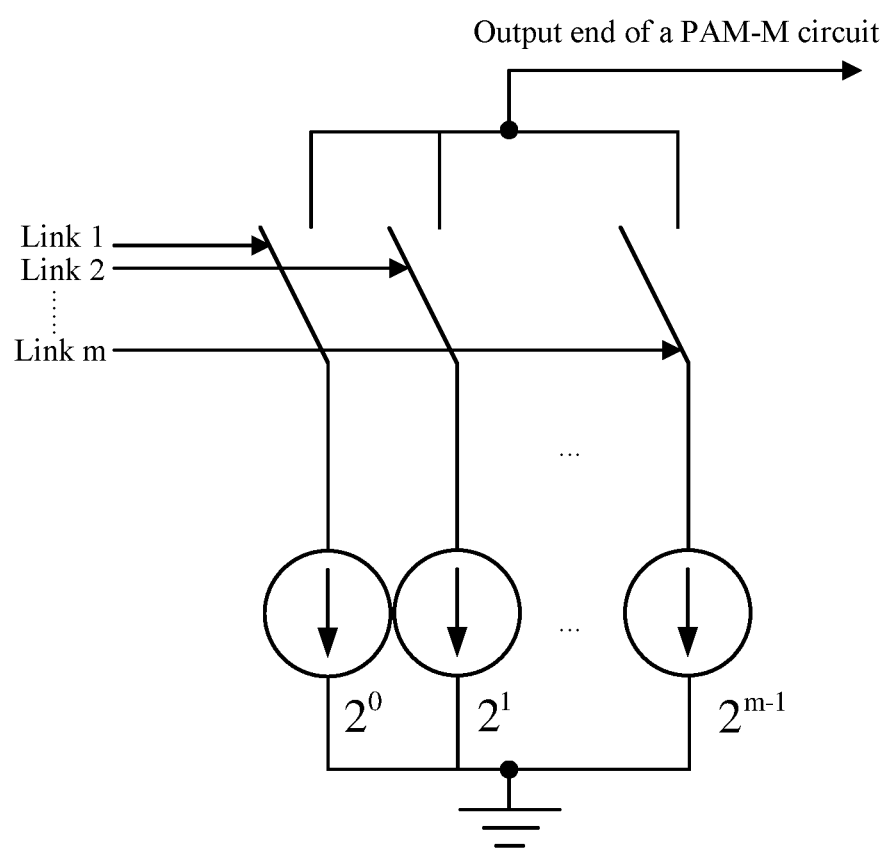
FIG. 1 is a schematic structural diagram of a PAM-M circuit according to this embodiment.

In a data transmission network provided in an embodiment of the present disclosure, a transmit end may perform modulation on data before sending the data to a receive end. As shown in FIG. 1, FIG. 1 is a schematic structural diagram of a PAM-M circuit provided in this embodiment. Data transmitted on m links is input to the PAM-M circuit for performing modulation. The PAM-M circuit is configured to modulate data transmitted on the $k^{th}$ link of the m links to a level corresponding to $2^{k-1}$, where k=1, . . . , m.

At the transmit end, the m links are connected to the PAM-M circuit separately, and the m links send the data to the PAM-M circuit for performing modulation. The data transmitted on the $k^{th}$ link of the m links is modulated to the level corresponding to $2^{k-1}$. At a time, the $k^{th}$ link sends only one data unit to the PAM-M circuit for performing modulation, where k=1, . . . , m. The data unit may be one bit or one symbol, where one symbol includes at least two bits. The PAM-M circuit modulates m data units received at a same time into a pulse signal having an amplitude corresponding to the m data units, and sends the pulse signal to the receive end.

After the receive end receives the pulse signal, a demodulation circuit at the receive end demodulates the pulse signal into m data units according to the amplitude of the pulse signal, and transmits the m data units using m links respectively.

An error may occur in a transmission process in which the pulse signal is transmitted to the receive end such that a bit error may occur in the m data units obtained after demodulation. Therefore, at the receive end, an FEC circuit is configured for each link of the m links separately, and is configured to perform error correction on data transmitted on the link.

After demodulation, bit error rates corresponding to data transmitted on different links of the m links may be different. In order to enable the m links to use a same FEC circuit, data transmitted on the m links may be processed first, and then the processed data is sent, using the m links, to the PAM-M circuit at the transmit end for performing modulation. Performing data processing on the data transmitted on the m links include coding the data transmitted on the m links.

After the demodulation circuit at the receive end demodulates modulated data, the receive end may perform a reverse operation of the foregoing data processing on demodulated data using a decoding circuit. Then, m FEC circuits at the receive end perform error correction on data obtained after the reverse operation. The receive end performs a reverse operation of coding on the data transmitted on the m links in order to try to generate data that is before an encoding circuit at the transmit end performs a coding operation on the data transmitted on the m links. In this way, bit error rates of data transmitted on the m links and generated by the decoding circuit can be approximately the same or the same. Further, the m links at the receive end may use a same FEC circuit to perform error correction on the data transmitted on the m links respectively. Therefore, the foregoing solution helps to reduce implementation complexity.

For example, the data processing may be executed by the encoding circuit. The encoding circuit may be a component in a physical layer (PHY), a PHY chip, a system chip, a multi-port Ethernet device, or an optical module.

The PHY may be implemented using a field-programmable gate array (FPGA) or an application-specific integrated circuit (ASIC). The PHY may be a component in a network interface card (NIC), where the NIC may be a line card or a physical interface card (PIC). The PHY may include a media-independent interface (MII) for interfacing to a media access control (MAC).

The PHY chip may include multiple PHYs. The PHY chip may be implemented using an FPGA or an ASIC.

The system chip may include multiple MACs and multiple PHYs. The system chip may be implemented using an FPGA or an ASIC.

The multi-port Ethernet device may be an Ethernet hub, an Ethernet router, or an Ethernet switch. The multi-port Ethernet device includes multiple ports, where each port may include a system chip, and the system chip may include a MAC and a PHY. The multi-port Ethernet device may further integrate multiple MACs into one MAC chip, and integrate multiple PHYs into one PHY chip. The multi-port Ethernet device may further integrate multiple MACs and multiple PHYs into one system chip.

The reverse operation of the data processing may be executed by the decoding circuit. The decoding circuit may be a component in a PHY, a PHY chip, a system chip, a multi-port Ethernet device, or an optical module.

In order to enable a person skilled in the art to better understand the solutions in the embodiments of the present disclosure, the following describes the embodiments of the present disclosure in more detail with reference to accompanying drawings and implementation manners.

Figure 2:
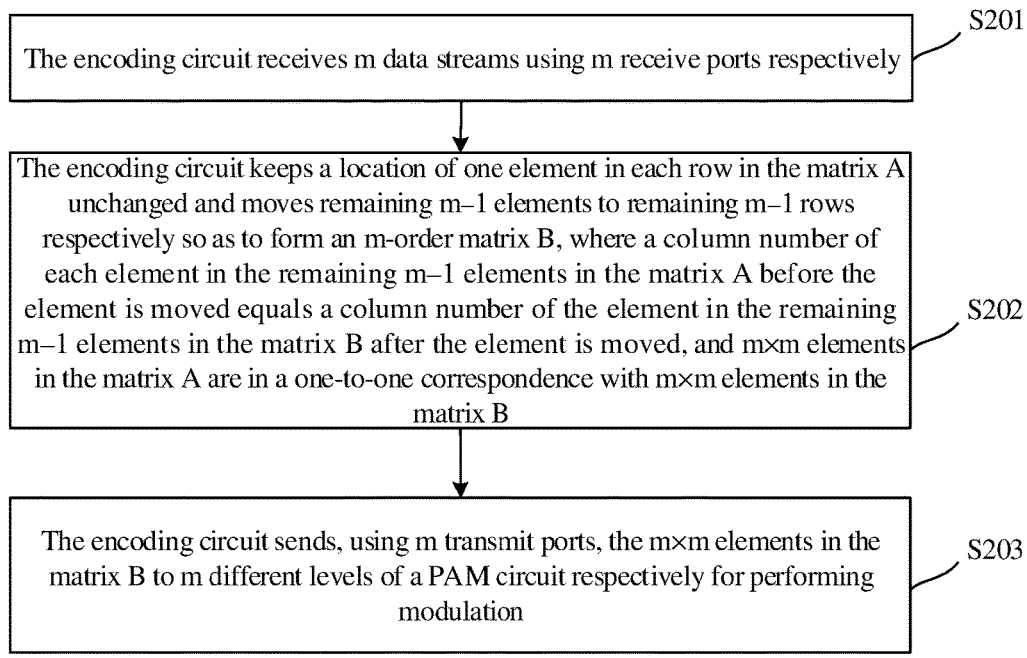
FIG. 2 is a flowchart of an embodiment of a data processing method according to the present disclosure.

Referring to FIG. 2, FIG. 2 is a flowchart of an embodiment of a data processing method according to the present disclosure. This embodiment describes in detail how an encoding circuit codes received data. In this embodiment, the data processing method includes the following steps.

Step S201: The encoding circuit receives m data streams using m receive ports respectively, where m is an integer greater than 1, the m receive ports are in a one-to-one correspondence with the m data streams, and the m data streams include m×m data units, where each data stream of the m data streams includes m data units, the m×m data units form an m-order matrix A, the m×m data units are m×m elements in the matrix A, m 1×m matrices in the matrix A are in a one-to-one correspondence with the m data streams, m elements located in a same m×1 matrix of m m×1 matrices in the matrix A are received by the encoding circuit at a same time, and among m elements located in a same 1×m matrix of the m 1×m matrices in the matrix A, an element located on a right side is received by the encoding circuit earlier than an element located on a left side.

In this embodiment, the m receive ports of the encoding circuit are in a one-to-one correspondence with m links respectively, and each receive port is configured to receive, in chronological sequence, data transmitted on a link corresponding to the receive port. For ease of description, in this embodiment, r is used to indicate a link of the m links, and t is used to indicate a receive port of the m receive ports, where r=1, . . . , m, and t=1, . . . , m. A receive port w is configured to receive, in chronological sequence, data transmitted on a link w. For example, a receive port 2 is configured to receive, in chronological sequence, data transmitted on a link 2. It should be noted that, in this specification, the link w and the $w^{th}$ link refer to a same link.

For example, m may be equal to 2, 3, 4, or 5.

Each receive port of the encoding circuit receives only one data unit at a time. For example, each receive port of the encoding circuit receives only one data unit during one clock cycle. The m receive ports receive m data units at a same time. For example, the m receive ports receive m data units during a same clock cycle. In order to make description of the solution clearer, in the whole specification, m data units in data transmitted on each link are regarded as one data stream. In addition, a matrix, which is a basic concept in mathematics, is used to describe the m data streams. In the following description, one element in a matrix is one data unit in a data stream.

Figure 3:
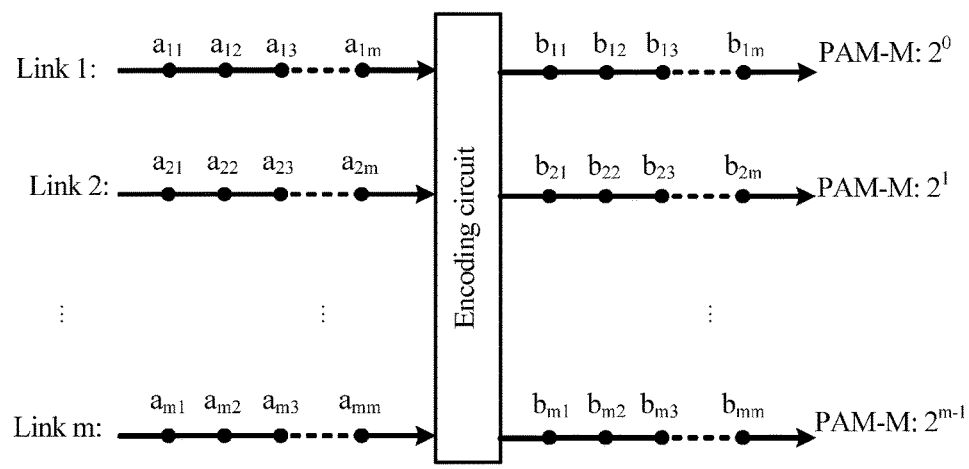
FIG. 3 is a schematic diagram of a matrix A, a matrix B, m links, and a PAM-M circuit.

In order to describe more intuitively the m-order matrix A corresponding to the m data streams, refer to FIG. 3. FIG. 3 is a schematic diagram of a matrix A, a matrix B, m links, and a PAM-M circuit. One data stream on each link of the m links form one line of the m-order matrix A, and each row consists of m data units. That is, one data stream on each link corresponds to one 1×m matrix, and the m-order matrix A includes m 1×m matrices. Moreover, a row number of a data stream in the matrix A is equal to a number of a link in which the data stream is located. For example, m elements located in the $3^{rd}$ row in the matrix A are a data stream transmitted on a link 3.

The m data units in each data stream of the m data streams are the $1^{st}$ data unit to the $m^{th}$ data unit respectively. A time sequence in which the encoding circuit receives the m data units in each data stream is from the $m^{th}$ data unit to the $1^{st}$ data unit separately. For example, when m is equal to 3, the encoding circuit receives the $3^{rd}$ data unit, the $2^{nd}$ data unit, and the $1^{st}$ data unit in the $1^{st}$ clock cycle, the $2^{nd}$ clock cycle, and the $3^{rd}$ clock cycle respectively. The $1^{st}$ clock cycle is a clock cycle previous to the $2^{nd}$ clock cycle, and the $2^{nd}$ clock cycle is a clock cycle previous to the $3^{rd}$ clock cycle. The $i^{th}$ data unit in each data stream of the m data streams forms the $i^{th}$ (where i=1, ..., m) column of the m-order matrix. Each column of the m-order matrix consists of m data units. That is, each column corresponds to one m×1 matrix. The m-order matrix includes m m×1 matrices, and m elements located in a same m×1 matrix are received by the encoding circuit at a same time.

For any two adjacent data units in any 1×m matrix of the m 1×m matrices, a data unit located on a right side is received by the encoding circuit earlier than a data unit located on a left side.

As shown in FIG. 3, a flow direction of the M data streams is from left to right. The flow direction of the M data streams in FIG. 3 is only exemplary, and does not indicate that a flow direction of a data stream in all scenarios applied to the embodiments of the present disclosure can only be from left to right.

Step S202: The encoding circuit keeps a location of one element in each row in the matrix A unchanged and moves remaining m−1 elements to remaining m−1 rows respectively so as to form an m-order matrix B, where a column number of each element in the remaining m−1 elements in the matrix A before the element is moved equals a column number of the element in the remaining m−1 elements in the matrix B after the element is moved, and the m×m elements in the matrix A are in a one-to-one correspondence with m×m elements in the matrix B.

For example, when the encoding circuit codes received data units, content of the data units is not changed, and only locations of the data units in the matrix A are changed so as to form the matrix B. When locations of elements in the matrix A are changed, a location of one element in each row in the matrix A is kept unchanged, and remaining m−1 elements are moved to remaining m−1 rows respectively so as to form the matrix B.

In a process in which each element in the remaining m−1 elements is moved, a number of a row in which the element is located is changed, but a number of a column in which the element is located is not changed. An element, whose location is kept unchanged, in each row in the matrix A is referred to as a fixed element, and m fixed elements in the matrix A may be located in a same column, or may be located in different columns respectively.

In order to describe the solution more clearly, $a_{ij}$ is introduced below to indicate the m×m elements in the matrix A, and $b_{ij}$ is introduced to indicate the m×m elements in the matrix B, where i=1, ..., m, and j=1, ..., m. The following describes a first specific implementation manner of a method for changing locations of elements in the matrix A.

For elements in the $1^{st}$ column on a left side of the matrix A, locations of all the elements are kept unchanged.

That is, $b_{i1}=a_{x1}$, where x=i.

For elements in the $2^{nd}$ column on the left side of the matrix A, all the elements are moved downward by one row. Then, in the $2^{nd}$ column, an element located in the $m^{th}$ row is moved to the $1^{st}$ row.

That is, $b_{i2}=a_{x2}$, where x=i−1 when i−1>0, and x=i−1+m when i−1<0, that is, x=m when i=1.

For elements in the $3^{rd}$ column on the left side of the matrix A, all the elements are moved downward by two rows. Then, in the $3^{rd}$ column, an element located in the $m^{th}$ row is moved to the $2^{nd}$ row, and an element located in the m−$1^{th}$ row is moved to the $1^{st}$ row.

That is, $b_{i3}=a_{x3}$, where x=i−2 when i−2>0, and x=i−2+m when i−2≤0, that is, z=m when i=2, and x=m−1 when i=1.

Elements in another column on the left side of the matrix A are deduced by analogy.

That is, $b_{ij}=a_{xj}$, and a value of x complies with the constraints, that x=i−k when i−k>0, and x=i−k+m when i−k≤0, where k is a quantity of rows by which elements in the k+$1^{th}$ column on the left side of the matrix A are moved downward, and k is an integer greater than or equal to 0 and less than m, that is, k=0, ..., m−1. In the matrix B, m elements in a same row correspond to different k values respectively. A difference between k values corresponding to two adjacent elements of elements in each row in the matrix B is 1.

Alternatively, in a second specific implementation manner of the method for changing locations of elements in the matrix A, it may also be that locations of elements in the $1^{st}$ column on a right side of the matrix A are kept unchanged. Elements in the $2^{nd}$ column on the right side of the matrix A are moved downward by one row, elements in the $3^{rd}$ column on the right side of the matrix A are moved downward by two rows, and another column on the right side of the matrix A is deduced by analogy. That is, $b_{ij}=a_{xj}$, and a value of x complies with the constraints, that x=i−k when i−k>0, and x=i−k+m when i−k<0, where k is a quantity of rows by which elements in the k+$1^{th}$ column on the right side of the matrix A are moved downward, and k is an integer greater than or equal to 0 and less than m, that is, k=0, ..., m−1. In the matrix B, m elements in a same row correspond to different k values respectively. A difference between k values corresponding to two adjacent elements of elements in each row in the matrix B is 1.

Alternatively, when the locations of the elements in the matrix A are changed, elements in each column may moved upward instead of moving downward. The following describes a third specific implementation manner of the method for changing locations of elements in the matrix A.

For elements in the $1^{st}$ column on a left side of the matrix A, locations of all the elements are kept unchanged.

That is, $b_{i1}=a_{x1}$, where x=i.

For elements in the $2^{nd}$ column on the left side of the matrix A, all the elements are moved upward by one row, then, in the $2^{nd}$ column, an element located in the $1^{st}$ row is moved to the $m^{th}$ row.

That is, $b_{i2}=a_{x2}$, where x=i+1 when i+1≤m, and x=i+1−m when i+1>m, that is, when i=m, x=1.

For elements in the $3^{rd}$ column on the left side of the matrix A, all the elements are moved upward by two rows. Then, in the $3^{rd}$ column, an element located in the $2^{nd}$ row is moved to the $m^{th}$ row, and an element located in the $1^{st}$ row is moved to the m−$1^{th}$ row.

That is, $b_{i3}=a_{x3}$, where x=i+2 when i+2≤m, and x=i+2−m when i+2>m, that is, x=2 when i=m, and x=1 when i=m−1.

Elements in another column on the left side of the matrix A are deduced by analogy.

That is, $b_{ij}=a_{xj}$, and a value of x complies with the constraints, that x=i+k when i+k≤m, and x=i+k−m when i+k>m, where k is a quantity of rows by which elements in the k+$1^{th}$ column on the left side of the matrix A are moved upward, and k is an integer greater than or equal to 0 and less than m, that is, k=0, ..., m−1. In the matrix B, m elements in a same row correspond to different k values respectively. A difference between k values corresponding to two adjacent elements of elements in each row in the matrix B is 1.

Alternatively, in a fourth specific implementation manner of the method for changing locations of elements in the matrix A, it may also be that locations of elements in the $1^{st}$ column on a right side of the matrix A are kept unchanged. Elements in the $2^{nd}$ column on the right side of the matrix A are moved upward by one row, elements in the $3^{rd}$ column on the right side of the matrix A are moved upward by two rows, and another column on the right side of the matrix A is deduced by analogy.

That is, $b_{ij}=a_{xj}$, and a value of x complies with the constraints, that $x=i+k$ when $i+k \le m$, and $x=i+k-m$ when $i+k>m$, where k is a quantity of rows by which elements in the $k+1^{th}$ column on the right side of the matrix A are moved upward, and k is an integer greater than or equal to 0 and less than m, that is, $k=0, \ldots, m-1$. In the matrix B, m elements in a same row correspond to different k values respectively. A difference between k values corresponding to two adjacent elements of elements in each row in the matrix B is 1.

In the foregoing four specific implementation manners of the method for changing locations of elements in the matrix A, a difference between k values corresponding to two adjacent elements of m elements in each row in the matrix B is 1, and a value of k corresponding to elements in the $1^{st}$ column on a left side or elements in the $1^{st}$ column on a right side of the matrix B is 0. Alternatively, in another specific implementation manner of the method for changing locations of elements in the matrix A, a value of k corresponding to elements in the $1^{st}$ column on a left side or elements in the $1^{st}$ column on a right side of the matrix B may also not be 0, but be any integer greater than 0 and less than m.

Further, in another specific implementation manner of the method for changing locations of elements in the matrix A, a difference between k values corresponding to two adjacent elements of elements in each row in the matrix B may also not be 1 but anther value, as long as m elements in a same row in the matrix B correspond to different k values respectively, where k is an integer greater than or equal to 0 and less than m.

Step S203: The encoding circuit sends, using m transmit ports, the m×m elements in the matrix B to m different levels of a PAM circuit respectively for performing modulation, where m 1×m matrices in the matrix B are in a one-to-one correspondence with the m different levels of the PAM circuit, m elements located in a same m×1 matrix of m m×1 matrices in the matrix B are sent by the encoding circuit at a same time, and among m elements located in a same 1×m matrix of the m 1×m matrices in the matrix B, an element located on a right side is sent by the encoding circuit earlier than an element located on a left side.

In this embodiment, the m transmit ports of the encoding circuit are in a one-to-one correspondence with m rows of elements in the matrix B, and each transmit port is configured to send, in chronological sequence, one line of elements corresponding to the transmit port. As shown in FIG. 3, for ease of description, in this embodiment, e is used to indicate a transmit port of the m transmit ports, where $e=1, \ldots, m$. A transmit port w is configured to send, in chronological sequence, elements in the $w^{th}$ row in the matrix B. For example, a transmit port 4 is configured to send, in chronological sequence, m elements in the $4^{th}$ row in the matrix B.

Among m elements in each row in the matrix B, an element located on a right side is received by the encoding circuit earlier than an element on a left side. Moreover, during sending, m elements located in a same column in the matrix B are sent by the encoding circuit at a same time.

Optionally, in the foregoing technical solution, the data processing method shown in FIG. 2 may further include receiving, by the encoding circuit, m data units using the m receive ports respectively.

The received m data units are in a one-to-one correspondence with the m receive ports, the received m data units are received by the encoding circuit at a same time, and the time at which the encoding circuit receives the received m data units is different from a time at which the encoding circuit receives m data units in any m×1 matrix of the m m×1 matrices in the matrix A.

The encoding circuit sends, using the m transmit ports, the received m data units to the m different levels of the PAM circuit respectively for performing modulation.

The received m data units are in a one-to-one correspondence with the m different levels.

The received m data units are independent of the m×m data units in the matrix A, the received m data units are not a subset of the m×m data units in the matrix A, and the time at which the encoding circuit receives the received m data units is different from a time at which the encoding circuit receives m data units in any m×1 matrix of the m m×1 matrices in the matrix A. For example, the time at which the encoding circuit receives the received m data units is different from a time at which the encoding circuit receives m data units in an m×1 matrix on the far left of the m m×1 matrices in the matrix A. The time at which the encoding circuit receives the received m data units is different from a time at which the encoding circuit receives m data units in an m×1 matrix on the far right of the m m×1 matrices in the matrix A.

Using the foregoing technical solution, the encoding circuit may perform different processing on data units received at different times. Further, for some data units (for example, the m×m data units in the matrix A), processing (for example, moving locations of data units in the matrix) of step S202 may be executed. For other data units (for example, the received m data units), the processing of step S202 is not executed before the data units are sent to the m different levels of the PAM circuit for performing modulation, which is equivalent to bypassing the processing of step S202.

In this embodiment, a schematic structural diagram of the PAM-M circuit may be that shown in FIG. 1 and FIG. 3. Data transmitted on m links is input to the PAM-M circuit for performing modulation. The PAM-M circuit is configured to modulate data transmitted on the $k^{th}$ link of the m links to a level corresponding to $2^{k-1}$, where $k=1, \ldots, m$.

As shown in FIG. 3, the m transmit ports of the encoding circuit are in a one-to-one correspondence with the m links, and data sent by each transmit port w enters the PAM-M circuit in chronological sequence using the link w, and is modulated by the PAM-M circuit to a level corresponding to $w^{-1}$. For example, data sent by a transmit port 5 is sent to the PAM-M circuit using a link 5, and is modulated by the PAM-M circuit to a level corresponding to $2^4$.

It should be noted that, data sent by the encoding circuit may not necessarily directly enter the PAM-M circuit for performing modulation. Another apparatus, for example, a precoding circuit, may also be disposed between the encoding circuit and the PAM-M circuit, which is not limited herein.

In this embodiment, before data streams in m links are sent to m different levels of a PAM circuit for performing modulation, an m-order matrix A formed by m data units on each link of the m links is coded using an encoding circuit such that m data units that are originally located in a same link and are to enter a same level of the PAM circuit for performing modulation are dispersed to the m links respectively and enter the m different levels of the PAM circuit respectively for performing modulation. In this way, when m pulse signals sent by the PAM circuit are successively demodulated and decoded to the m links, a probability that a bit error occurs on each link can be balanced, and therefore FEC circuits corresponding to different links may use a same FEC gain, and system implementation complexity is reduced.

The foregoing describes a data processing method at a transmit end with reference to FIG. 2 and FIG. 3. The following describes a reverse operation of the foregoing data processing method at a receive end with reference to FIG. 4. For ease of description, the reverse operation of the foregoing data processing method is referred to as a data processing method.

Figure 4:
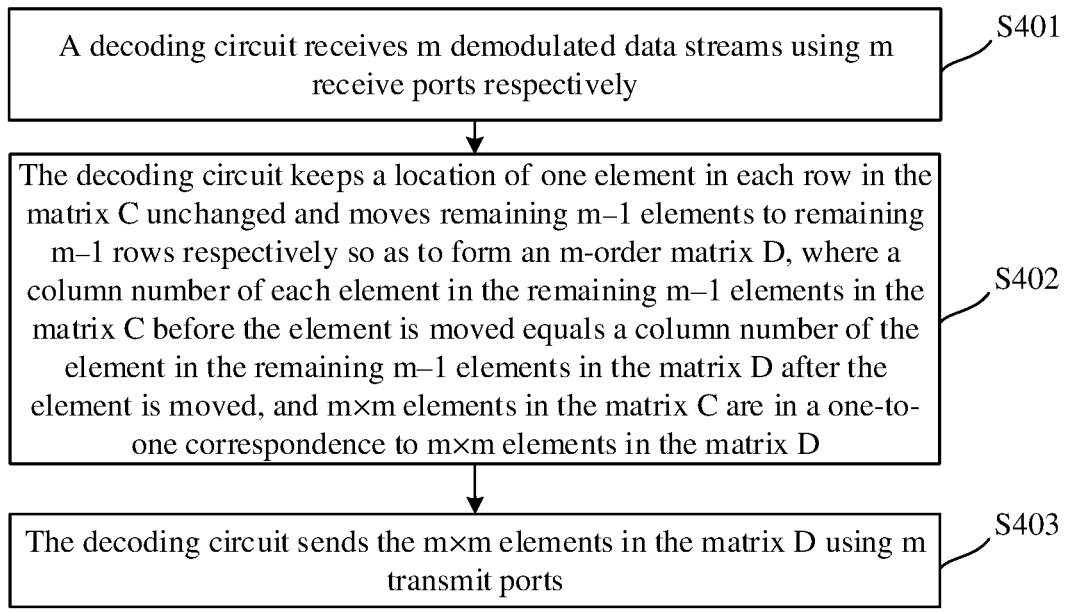
FIG. 4 is a flowchart of an embodiment of a data processing method according to the present disclosure.

Referring to FIG. 4, FIG. 4 is a flowchart of an embodiment of a data processing method according to the present disclosure. In this embodiment, the data processing method includes the following steps.

Step S401: A decoding circuit receives m demodulated data streams using m receive ports respectively, where m is an integer greater than 1, the m receive ports are in a one-to-one correspondence with the m data streams, and the m data streams include m×m data units, where each data stream of the m data streams includes m data units, the m×m data units form an m-order matrix C, the m×m data units are m×m elements in the matrix C, m 1×m matrices in the matrix C are in a one-to-one correspondence with the m data streams, m elements located in a same m×1 matrix of m m×1 matrices in the matrix C are received by the decoding circuit at a same time, and among m elements located in a same 1×m matrix of the m 1×m matrices in the matrix C, an element located on a right side is received by the decoding circuit earlier than an element located on a left side.

For example, m may be equal to 2, 3, 4, or 5.

For example, the m data streams may be obtained using the following way. A demodulation circuit receives a pulse signal sent by a transmit end, and the demodulation circuit demodulates the pulse signal into m data units and transmits the m data units using m links respectively.

Each receive port of the decoding circuit receives only one data unit at a time. For example, each receive port of the decoding circuit receives only one data unit during one clock cycle. The m receive ports receive m data units at a same time. For example, the m receive ports receive m data units during a same clock cycle.

The m receive ports of the decoding circuit are in a one-to-one correspondence with m links respectively, and each receive port is configured to receive, in chronological sequence, data transmitted on a link corresponding to the receive port.

A process in which the m receive ports of the decoding circuit receive the m demodulated data streams respectively is similar to a process in which "m receive ports of an encoding circuit receive m data streams respectively" in step S201 in the embodiment shown in FIG. 2. For details, reference may be made to related description of step S201, which is not described herein again.

Step S402: The decoding circuit keeps a location of one element in each row in the matrix C unchanged and moves remaining m−1 elements to remaining m−1 rows respectively so as to form an m-order matrix D, where a column number of each element in the remaining m−1 elements in the matrix C before the element is moved equals a column number of the element in the remaining m−1 elements in the matrix D after the element is moved, and the m×m elements in the matrix C are in a one-to-one correspondence with m×m elements in the matrix D.

For example, when the decoding circuit decodes received data units, content of the data units is not changed, and only locations of the data units in the matrix C are changed so as to form the matrix D.

When locations of elements in the matrix C are changed, a location of one element in each row in the matrix C is kept unchanged, and remaining m−1 elements are moved to remaining m−1 rows respectively so as to form the matrix D. In a process in which each element in the remaining m−1 elements is moved, a number of a row in which the element is located is changed, but a number of a column in which the element is located is not changed. An element, whose location is kept unchanged, in each row in the matrix C is referred to as a fixed element.

The decoding circuit decodes the received data units to execute a reverse operation corresponding to data processing in the embodiment shown in FIG. 2. Therefore, a fixed element in each row in the matrix C is separately the same as a fixed element in each row in the matrix A in the embodiment shown in FIG. 2. When the remaining m−1 elements in each row in the matrix C are moved to the remaining m−1 rows respectively, a specific implementation manner depends on a specific implementation manner that is used by the encoding circuit at the transmit end to change locations of elements in the matrix A.

In order to describe the solution more clearly, $c_{ij}$ is introduced below to indicate the m×m elements in the matrix C, and $d_{ij}$ is introduced to indicate the m×m elements in the matrix D, where i=1, . . . , m, and j=1, . . . , m.

When a method for changing locations of elements in the matrix A includes the first specific implementation manner of step S202 in the embodiment shown in FIG. 2, a method for changing locations of elements in the matrix C is as follows.

For elements in the $1^{st}$ column on a left side of the matrix C, locations of all the elements are kept unchanged.

That is, $d_{i1}=c_{y1}$, where y=i.

For elements in the $2^{nd}$ column on the left side of the matrix C, all the elements are moved upward by one row, then, in the $2^{nd}$ column, an element located in the $1^{st}$ row is moved to the $m^{th}$ row.

That is, $d_{i2}=c_{y2}$, where y=i+1 when i+1≤m, and y=i+1−m when i+1>m, that is, when i=m, y=1.

For elements in the $3^{rd}$ column on the left side of the matrix C, all the elements are moved upward by two rows. Then, in the $3^{rd}$ column, an element located in the $2^{nd}$ row is moved to the $m^{th}$ row, and an element located in the $1^{st}$ line is moved to the m−$1^{th}$ row.

That is, $d_{i3}=c_{y3}$, where y=i+2 when i+2≤m, and y=i+2−m when i+2>m, that is, y=2 when i=m, and y=1 when i=m−1.

Elements in another column on the left side of the matrix C are deduced by analogy. That is, $d_{ij}=c_{yj}$, and a value of y complies with the constraints, that y=i+k when i+k≤m, and y=i+k−m when i+k>m, where k is a quantity of rows by which elements in the k+$1^{th}$ column on the left side of the matrix C are moved upward, and k is an integer greater than or equal to 0 and less than m, that is, k=0, . . . , m−1. In the matrix D, m elements in a same row correspond to different k values respectively. A difference between k values corresponding to two adjacent elements of elements in each row in the matrix D is 1.

When the method for changing locations of elements in the matrix A includes the second specific implementation manner of step S202 in the embodiment shown in FIG. 2, the method for changing locations of elements in the matrix C is as follows.

Locations of elements in the $1^{st}$ column on a right side of the matrix C are kept unchanged. Elements in the $2^{nd}$ column on the right side of the matrix C are moved upward by one row, elements in the $3^{rd}$ column on the right side of the matrix C are moved upward by two rows, and another column on the right side of the matrix C is deduced by analogy. It can be obtained that $b_{ij}=a_{yj}$, and a value of y complies with the constraints, that y=i+k when i+k≤m, and y=i+k−m when i+k>m, where k is a quantity of rows by which elements in the k+1$^{th}$ column on the right side of the matrix C are moved upward, and k is an integer greater than or equal to 0 and less than m, that is, k=0, . . . , m−1. In the matrix D, m elements in a same row correspond to different k values respectively. A difference between k values corresponding to two adjacent elements of elements in each row in the matrix D is 1.

When the method for changing locations of elements in the matrix A includes the third specific implementation manner of step S202 in the embodiment shown in FIG. 2, the method for changing locations of elements in the matrix C is as follows.

For elements in the 1$^{st}$ column on a left side of the matrix C, locations of all the elements are kept unchanged.

That is, $d_{i1}=c_{y1}$, where y=i.

For elements in the 2$^{nd}$ column on the left side of the matrix C, all the elements are moved downward by one row. Then, in the 2$^{nd}$ column, an element located in the m$^{th}$ row is moved to the 1$^{st}$ row.

That is, $d_{i2}=c_{y2}$, where y=i−1 when i−1>0, and y=i−1+m when i−1≤0, that is, when i=1, y=m.

For elements in the 3$^{rd}$ column on the left side of the matrix C, all the elements are moved downward by two rows. Then, in the 3$^{rd}$ column, an element located in the m$^{th}$ row is moved to the 2$^{nd}$ row, and an element located in the m−1$^{th}$ row is moved to the 1$^{st}$ row.

That is, $d_{i3}=c_{y3}$, where y=i−2 when i−2>0, and y=i−2+m when i−2≤0, that is, y=m when i=2, and y=m−1 when i=1.

Elements in another column on the left side of the matrix C are deduced by analogy.

That is, $b_{ij}=a_{xj}$, and a value of y complies with the constraints, that y=i−k when i−k>0, and y=i−k+m when i−k≤0, where k is a quantity of rows by which elements in the k+1$^{th}$ column on the left side of the matrix C are moved downward, and k is an integer greater than or equal to 0 and less than m, that is, k=0, . . . , m−1. In the matrix D, m elements in a same row correspond to different k values respectively. A difference between k values corresponding to two adjacent elements of elements in each row in the matrix D is 1.

When the method for changing locations of elements in the matrix A includes the fourth specific implementation manner of step S202 in the embodiment shown in FIG. 2, the method for changing locations of elements in the matrix C is as follows.

Locations of elements in the 1$^{st}$ column on a right side of the matrix C are kept unchanged. Elements in the 2$^{nd}$ column on the right side of the matrix C are moved downward by one row, elements in the 3$^{rd}$ column on the right side of the matrix C are moved downward by two rows, and another column on the right side of the matrix C is deduced by analogy. That is, $d_{ij}=c_{yj}$, and a value of y complies with the constraints, that y=i−k when i−k>0, and y=i−k+m when i−k≤0, where k is a quantity of rows by which elements in the k+1$^{th}$ column on the right side of the matrix C are moved downward, and k is an integer greater than or equal to 0 and less than m, that is, k=0, . . . , m−1. In the matrix D, m elements in a same row correspond to different k values respectively. A difference between k values corresponding to two adjacent elements of elements in each row in the matrix D is 1.

In another specific implementation manner of changing locations of elements in the matrix A, that is, when a difference between k values corresponding to two adjacent elements of m elements in each row in the matrix B is 1, and a value of k corresponding to elements in the 1$^{st}$ column on a left side or elements in the 1$^{st}$ column on a right side of the matrix B is any integer (denoted by g) greater than 0 and less than m, the method for changing locations of elements in the matrix C includes that a difference between k values corresponding to two adjacent elements of m elements in each row in the matrix D is 1, and a value of k corresponding to elements in the 1$^{st}$ column on a left side or elements in the 1$^{st}$ column on a right side of the matrix D is g.

Further, when the method for changing locations of elements in the matrix A is that m elements in a same row in the matrix B correspond to different k values respectively, where k is an integer greater than or equal to 0 and less than m, the method for changing locations of elements in the matrix C includes that m elements in a same row in the matrix D correspond to different k values respectively, where k is an integer greater than or equal to 0 and less than m.

Step S403: The decoding circuit sends the m×m elements in the matrix D using m transmit ports, where m elements located in a same m×1 matrix of m m×1 matrices in the matrix D are sent by the decoding circuit at a same time, and among m elements located in a same 1×m matrix of m 1×m matrices in the matrix D, an element located on a right side is sent by the encoding circuit earlier than an element located on a left side.

In this embodiment, a process in which the m transmit ports of the decoding circuit send the m×m elements in the matrix D is similar to a process in which "m transmit ports of an encoding circuit send m×m elements in the matrix B" in S203 in the embodiment shown in FIG. 2. For details, reference may be made to related description of S203, which is not described herein again.

Optionally, in the foregoing technical solution, the data processing method shown in FIG. 4 may further include receiving, by the decoding circuit, m demodulated data units using the m receive ports respectively.

The received and demodulated m data units are in a one-to-one correspondence with the m receive ports, the received and demodulated m data units are received by the decoding circuit at a same time, and the time at which the decoding circuit receives the received and demodulated m data units is different from a time at which the decoding circuit receives m data units in any m×1 matrix of the m m×1 matrices in the matrix C.

The decoding circuit sends the received and demodulated m data units using the m transmit ports respectively.

The received and demodulated m data units are in a one-to-one correspondence with the m transmit ports.

Further, the received and demodulated m data units are independent of the m×m data units in the matrix C, the received and demodulated m data units are not a subset of the m×m data units in the matrix C, and the time at which the decoding circuit receives the received and demodulated m data units is different from a time at which the decoding circuit receives m data units in any m×1 matrix of the m m×1 matrices in the matrix C. For example, the time at which the decoding circuit receives the received and demodulated m data units is different from a time at which the decoding circuit receives m data units in an m×1 matrix on the far left of the m m×1 matrices in the matrix C. The time at which the decoding circuit receives the received and demodulated m data units is different from a time at which the decoding circuit receives m data units in an m×1 matrix on the far right of the m m×1 matrices in the matrix C.

Using the foregoing technical solution, the decoding circuit may perform different processing on data units received at different times. Further, for some data units (for example, the m×m data units in the matrix C), processing (for example, moving locations of data units in the matrix) of step S402 may be executed. For other data units (for example, the received and demodulated m data units), the processing of step S402 is not executed before the data units are sent using the m transmit ports, which is equivalent to bypassing the processing of step S402.

Figure 5:
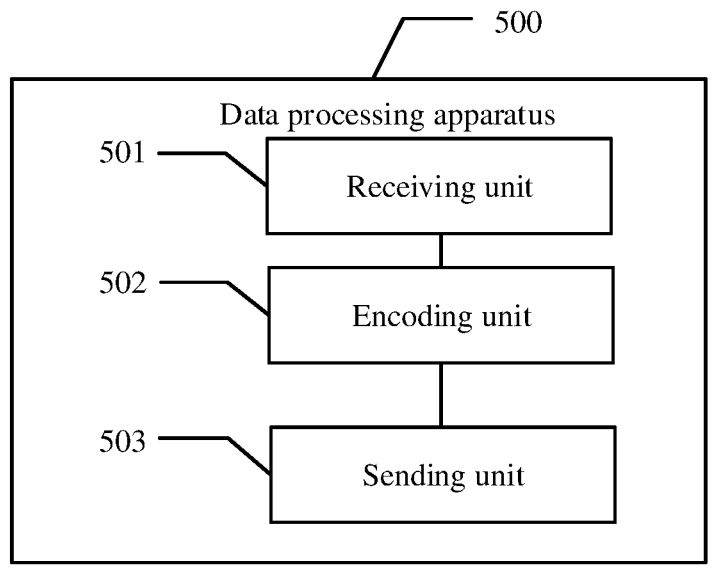
FIG. 5 is a schematic structural diagram of an embodiment of a data processing apparatus according to the present disclosure.

The foregoing describes a data processing method in an embodiment of the present disclosure. The following describes a data processing apparatus in an embodiment of the present disclosure. Referring to FIG. 5, FIG. 5 is a schematic structural diagram of an embodiment of a data processing apparatus 500 according to the present disclosure. A data processing apparatus 500 in this embodiment may be configured to execute the data processing method in the embodiment shown in FIG. 2. The data processing apparatus 500 in this embodiment of the present disclosure includes a receiving unit 501, an encoding unit 502, and a sending unit 503.

The receiving unit 501 is configured to receive m data streams using m receive ports respectively, where m is an integer greater than 1, the m receive ports are in a one-to-one correspondence with the m data streams, and the m data streams include m×m data units, where each data stream of the m data streams includes m data units, the m×m data units form an m-order matrix A, the m×m data units are m×m elements in the matrix A, m 1×m matrices in the matrix A are in a one-to-one correspondence with the m data streams, m elements located in a same m×1 matrix of m m×1 matrices in the matrix A are received by the receiving unit 501 at a same time, and among m elements located in a same 1×m matrix of the m 1×m matrices in the matrix A, an element located on a right side is received by the receiving unit 501 earlier than an element located on a left side.

For example, the receiving unit 501 in this embodiment may be a receiver. The receiving unit 501 may be configured to execute step S201 in the data processing method shown in FIG. 2. For details about the receiving unit 501, reference may be made to related description of step S201, which is not described herein again.

The encoding unit 502 is configured to keep a location of one element in each row in the matrix A received by the receiving unit 501 unchanged and move remaining m−1 elements to remaining m−1 rows respectively so as to form an m-order matrix B, where a column number of each element in the remaining m−1 elements in the matrix A before the element is moved equals a column number of the element in the remaining m−1 elements in the matrix B after the element is moved, and the m×m elements in the matrix A are in a one-to-one correspondence with m×m elements in the matrix B.

For example, the encoding unit 502 in this embodiment may be an encoder.

Optionally, the m×m elements in the matrix A are denoted by $a_{ij}$, the m×m elements in the matrix B are denoted by $b_{ij}$, i=1, . . . , m, and j=1, m, where $b_{ij}=a_{xj}$, and a value of x is x=i+k when i+k≤m, and x=i+k−m when i+k>m, where k is an integer greater than or equal to 0 and less than m, and m elements in a same row in the matrix B correspond to different k values respectively, or x=i−k when i−k>0, and x=i−k+m when i−k≤0, where k is an integer greater than or equal to 0 and less than m, and m elements in a same row in the matrix B correspond to different k values respectively.

Optionally, a difference between k values corresponding to two adjacent elements of elements in each row in the matrix B is 1.

The encoding unit 502 may be configured to execute step S202 in the data processing method shown in FIG. 2. For details about the encoding unit 502, reference may be made to related description of step S202, which is not described herein again.

The sending unit 503 is configured to send, using m transmit ports, the m×m elements in the matrix B generated by the encoding unit to m different levels of a PAM circuit respectively for performing modulation, where m 1×m matrices in the matrix B are in a one-to-one correspondence with the m different levels of the PAM circuit, m elements located in a same m×1 matrix of m m×1 matrices in the matrix B are sent by the sending unit 503 at a same time, and among m elements located in a same 1×m matrix of the m 1×m matrices in the matrix B, an element located on a right side is sent by the sending unit 503 earlier than an element located on a left side.

For example, the sending unit 503 in this embodiment may be a transmitter. The sending unit 503 may be configured to execute step S203 in the data processing method shown in FIG. 2. For details about the sending unit 503, reference may be made to related description of step S203, which is not described herein again.

Optionally, in the foregoing technical solution the receiving unit 501 is further configured to receive m data units using the m receive ports respectively.

The received m data units are in a one-to-one correspondence with the m receive ports, the received m data units are received by the receiving unit 501 at a same time, and the time at which the receiving unit 501 receives the received m data units is different from a time at which the receiving unit 501 receives m data units in any m×1 matrix of the m m×1 matrices in the matrix A.

The sending unit 503 is further configured to send, using the m transmit ports, the received m data units to the m different levels of the PAM circuit respectively for performing modulation.

The received m data units are in a one-to-one correspondence with the m different levels.

For details about the received m data units, reference may be made to the description in the embodiment corresponding to FIG. 2, which is not described herein again.

Figure 6:
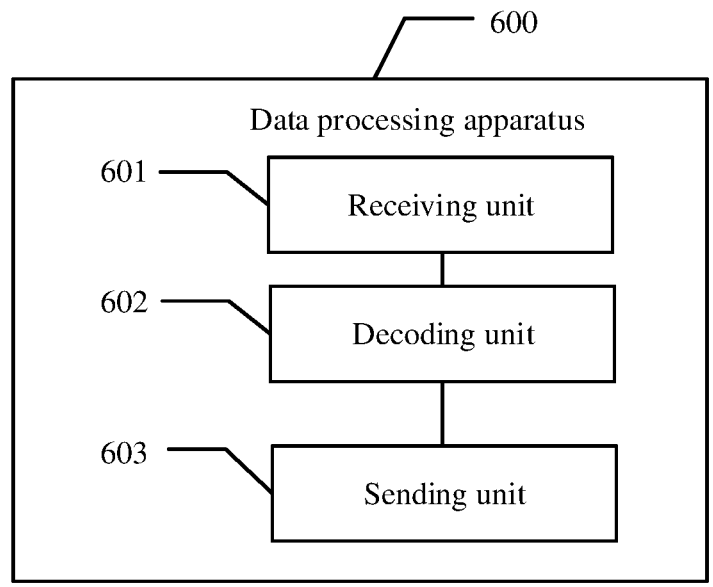
FIG. 6 is a schematic structural diagram of an embodiment of a data processing apparatus according to the present disclosure.

Referring to FIG. 6, FIG. 6 is a schematic structural diagram of an embodiment of a data processing apparatus 600 according to the present disclosure. The data processing apparatus 600 in this embodiment may be configured to execute the data processing method in the embodiment shown in FIG. 4. The data processing apparatus 600 in this embodiment of the present disclosure includes a receiving unit 601, a decoding unit 602, and a sending unit 603.

The receiving unit 601 is configured to receive m demodulated data streams using m receive ports respectively, where m is an integer greater than 1, the m receive ports are in a one-to-one correspondence with the m data streams, and the m data streams include m×m data units, where each data stream of the m data streams includes m data units, the m×m data units form an m-order matrix C, the m×m data units are m×m elements in the matrix C, m 1×m matrices in the matrix C are in a one-to-one correspondence with the m data streams, m elements located in a same m×1 matrix of m m×1 matrices in the matrix C are received by the receiving unit 601 at a same time, and among m elements located in a same 1×m matrix of the m 1×m matrices in the matrix C, an element located on a right side is received by the receiving unit 601 earlier than an element located on a left side.

For example, the receiving unit 601 in this embodiment may be a receiver. The receiving unit 601 may be configured to execute step S401 in the data processing method shown in FIG. 4. For details about the receiving unit 601, reference may be made to related description of step S401, which is not described herein again.

The decoding unit 602 is configured to keep a location of one element in each row in the matrix C received by the receiving unit 601 unchanged and move remaining m−1 elements to remaining m−1 rows respectively so as to form an m-order matrix D, where a column number of each element in the remaining m−1 elements in the matrix C before the element is moved equals a column number of the element in the remaining m−1 elements in the matrix D after the element is moved, and the m×m elements in the matrix C are in a one-to-one correspondence with m×m elements in the matrix D.

For example, the decoding unit 602 in this embodiment may be a decoder.

Optionally, the m×m elements in the matrix C are denoted by $c_{ij}$, the m×m elements in the matrix D are denoted by $d_{ij}$, i=1, . . . , m, and j=1, . . . , m, where $d_{ij}=c_{yj}$, and a value of y is y=i−k when i−k>0, and y=i−k+m when i−k≤0, where k is an integer greater than or equal to 0 and less than m, and m elements in a same row in the matrix D correspond to different k values respectively, or y=i+k when i+k≤m, and y=i+k−m when i+k>m, where k is an integer greater than or equal to 0 and less than m, and m elements in a same row in the matrix D correspond to different k values respectively.

Optionally, a difference between k values corresponding to two adjacent elements of elements in each row in the matrix D is 1.

The decoding unit 602 may be configured to execute step S402 in the data processing method shown in FIG. 4. For details about the decoding unit 602, reference may be made to related description of step S402, which is not described herein again.

The sending unit 603 is configured to send, using m transmit ports, the m×m elements in the matrix D generated by the decoding unit 602, where m elements located in a same m×1 matrix of m m×1 matrices in the matrix D are sent by the sending unit 603 at a same time, and among m elements located in a same 1×m matrix of m 1×m matrices in the matrix D, an element located on a right side is sent by the sending unit 603 earlier than an element located on a left side.

For example, the sending unit 603 in this embodiment may be a transmitter. The sending unit 603 may be configured to execute step S403 in the data processing method shown in FIG. 4. For details about the sending unit 603, reference may be made to related description of step S403, which is not described herein again.

Optionally, in the foregoing technical solution, the receiving unit 601 is further configured to receive m demodulated data units using the m receive ports respectively.

The received and demodulated m data units are in a one-to-one correspondence with the m receive ports, the received and demodulated m data units are received by the receiving unit 601 at a same time, and the time at which the receiving unit 601 receives the received and demodulated m data units is different from a time at which the receiving unit 601 receives m data units in any m×1 matrix of the m m×1 matrices in the matrix C.

The sending unit 603 is further configured to send the received and demodulated m data units using the m transmit ports respectively.

The received and demodulated m data units are in a one-to-one correspondence with the m transmit ports.

For details about the received and demodulated m data units, reference may be made to the description in the embodiment corresponding to FIG. 4, which is not described herein again.

Figure 7:
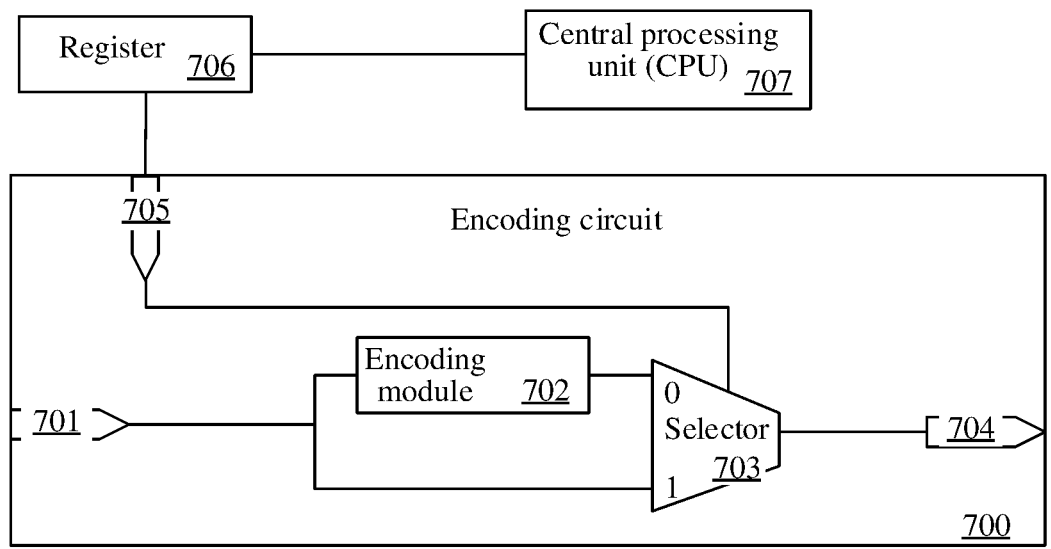
FIG. 7 is a schematic structural diagram of an embodiment of an encoding circuit according to the present disclosure.

FIG. 7 is a schematic structural diagram of an encoding circuit 700 provided in an embodiment. Referring to FIG. 7, the encoding circuit 700 includes a port 701, an encoding module 702, a selector 703, a port 704, and a port 705. The port 701 is coupled to an input end of the encoding module 702. An output end of the encoding module 702 is coupled to a first input end of the selector 703. The port 701 is coupled to a second input end of the selector 703. The port 705 is coupled to a selection signal input end of the selector 703. An output end of the selector 703 is coupled to the port 704. In addition, a register 706 is coupled to the port 705. A central processing unit (CPU) 707 is coupled to the register 706. The encoding circuit 700 may be configured to implement the data processing apparatus 500 shown in FIG. 5.

For example, the port 701 may be configured to implement the receiving unit 501. The port 701 may be the m receive ports in the embodiment corresponding to FIG. 5. The port 704 may be configured to implement the sending unit 503. Further, the port 704 may be the m transmit ports in the embodiment corresponding to FIG. 5. The encoding module 702 may be configured to implement the encoding unit 502.

Referring to FIG. 7, after receiving data, the port 701 duplicates the received data so as to obtain data 1 (not shown) and data 2 (not shown). The received data is the same as the data 1. The data 1 is the same as the data 2. The port 701 sends the data 1 to the encoding module 702. The port 701 sends the data 2l to the second input end of the selector 703. Therefore, data received by the selector 703 using the first input end is data processed by the encoding module 702, and data received by the selector 703 using the second input end is data not processed by the encoding module 702. The CPU 707 may set a value of the register 706 to 0 or 1. The selection signal input end of the selector 703 may obtain the value of the register 706 using the port 705. When a signal received by the selection signal input end of the selector 703 is 0, the selector 703 sends, using the output end of the selector 703, data received by the first input end (that is, the data processed by the encoding module 702) to the port 704. When a signal received by the selection signal input end of the selector 703 is 1, the selector 703 sends, using the output end of the selector 703, data received by the second input end (that is, the data not processed by the encoding module 702) to the port 704. That is, the CPU 707 may set the value of the register 706 to different values at different times in order to control whether the selector 703 outputs the data processed by the encoding module 702. For example, with reference to the embodiment shown in FIG. 5, when the CPU 707 sets the value of the register 706 to 0, the selector 703 may send the m×m elements in the matrix B in the embodiment shown in FIG. 5 to the port 704. When the CPU 707 sets the value of the register 706 to 1, the selector 703 may send the received m data units in the embodiment shown in FIG. 5 to the port 704.

In addition, a decoding circuit may be obtained using a working principle of the encoding circuit 700 shown in FIG. 7 and properly reconstructing the encoding circuit 700 (for example, replacing the encoding module 702 with a decoding module capable of executing processing of step S402). A person skilled in the art may understand that the decoding circuit obtained using the working principle of the encoding circuit 700 and performing proper reconstruction can implement the data processing apparatus shown in FIG. 6.

Based on the foregoing descriptions of the implementation manners, a person skilled in the art may clearly understand that all or some steps of the methods in the foregoing embodiments may be implemented by software in addition to a general hardware platform. Based on such an understanding, the technical solutions of the present disclosure essentially or the part contributing to the prior art may be implemented in a form of a software product. The computer software product is stored in a storage medium, such as a read-only memory (ROM)/random access memory (RAM), a hard disk, or an optical disc, and includes several instructions for instructing a computer device (which may be a personal computer, a server, or a network communications device such as a media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly. For related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present disclosure without creative efforts.

The foregoing descriptions are merely preferred implementation manners of the present disclosure, but are not intended to limit the protection scope of the present disclosure. It should be noted that a person of ordinary skill in the art may make some improvements and polishing without departing from the principle of the present disclosure and the improvements and polishing shall fall within the protection scope of the present disclosure.

What is claimed is:

1. A data processing method, comprising:
   receiving, by an encoding circuit, m data streams using m receive ports respectively, wherein m is an integer greater than 1, wherein the m receive ports are in a one-to-one correspondence with the m data streams, wherein the m data streams comprise m×m data units, wherein each data stream of the m data streams comprises m data units, wherein the m×m data units form an m-order matrix A, wherein the m×m data units are m×m elements in the matrix A, wherein m 1×m matrices in the matrix A are in a one-to-one correspondence with the m data streams, wherein m elements located in a same m×1 matrix of m m×1 matrices in the matrix A are received by the encoding circuit at a same time, and wherein among m elements located in a same 1×m matrix of the m 1×m matrices in the matrix A, an element located on a right side is received earlier than an element located on a left side;
   keeping, by the encoding circuit, a location of one element in each row in the matrix A unchanged and moving remaining m−1 elements to remaining m−1 rows respectively to form an m-order matrix B, wherein a column number of each element in the remaining m-elements in the matrix A before the element is moved equals a column number of the element in the remaining m−1 elements in the matrix B after the element is moved, and wherein the m×m elements in the matrix A are in a one-to-one correspondence with m×m elements in the matrix B; and
   sending, by the encoding circuit using m transmit ports, the m×m elements in the matrix B to m different levels of a pulse amplitude modulation (PAM) circuit respectively to perform modulation, wherein m 1×m matrices in the matrix B are in a one-to-one correspondence with the m different levels of the PAM circuit, wherein m elements located in a same m×1 matrix of m m×1 matrices in the matrix B are sent at a same time, wherein among m elements located in a same 1×m matrix of the m 1×m matrices in the matrix B, an element located on a right side is sent earlier than an element located on a left side, wherein the m×m elements in the matrix A are denoted by $a_{ij}$, wherein the m×m elements in the matrix B are denoted by $b_{ij}$, wherein i=1, . . ., m, wherein j=1, . . ., m, wherein $b_{ij}=a_{xj}$, and wherein a value of x is:
   x=i+k when i+k≤m;
   x=i+k−m when i+k>m;
   x=i−k when i−k>0; and
   x=i−k+m when i−k≤0,
   wherein k is an integer greater than or equal to 0 and less than m, and
   wherein m elements in a same row in the matrix B correspond to different k values respectively.

2. The data processing method of claim 1, wherein a difference between k values corresponding to two adjacent elements of elements in each row in the matrix B is 1.

3. The data processing method of claim 1, further comprising:
   receiving, by the encoding circuit, the m data units using the m receive ports respectively, wherein the received m data units are in a one-to-one correspondence with the m receive ports, wherein the received m data units are received at a same time, and wherein a time at which the encoding circuit receives the received m data units is different from a time at which the encoding circuit receives m data units in any m×1 matrix of the m m×1 matrices in the matrix A; and
   sending, by the encoding circuit using the m transmit ports, the received m data units to the m different levels of the PAM circuit respectively to perform modulation, wherein the received m data units are in a one-to-one correspondence with the m different levels of the PAM circuit.

4. A data processing method, comprising:
   receiving, by a decoding circuit, m demodulated data streams using m receive ports respectively, wherein m is an integer greater than 1, wherein the m receive ports are in a one-to-one correspondence with the m demodulated data streams, wherein the m demodulated data streams comprise m×m data units, wherein each data stream of the m demodulated data streams comprises m data units, wherein the m×m data units form an m-order matrix C, wherein the m×m data units are m×m elements in the matrix C, wherein m 1×m matrices in the matrix C are in a one-to-one correspondence with the m demodulated data streams, wherein m elements located in a same m×1 matrix of m m×1 matrices in the matrix C are received at a same time, and wherein among m elements located in a same 1×m matrix of the m 1×m matrices in the matrix C, an element located on a right side is received earlier than an element located on a left side;

keeping, by the decoding circuit, a location of one element in each row in the matrix C unchanged and moving remaining m−1 elements to remaining m−1 rows respectively in order to form an m-order matrix D, wherein a column number of each element in the remaining m−1 elements in the matrix C before the element is moved equals a column number of the element in the remaining m−1 elements in the matrix D after the element is moved, and wherein the m×m elements in the matrix C are in a one-to-one correspondence with m×m elements in the matrix D; and sending, by the decoding circuit, the m×m elements in the matrix D using m transmit ports, wherein m elements located in a same m×1 matrix of m m×1 matrices in the matrix D are sent at a same time, wherein among m elements located in a same 1×m matrix of m 1×m matrices in the matrix D, an element located on a right side is sent by the decoding circuit earlier than an element located on a left side, wherein the m×m elements in the matrix C are denoted by $c_{ij}$, wherein the m×m elements in the matrix D are denoted by $d_{ij}$, wherein i=1, . . ., m, wherein j=1, . . ., m, wherein $d_{ij}=c_{yj}$, and wherein a value of y is:

y=i−k when i−k>0;
y=i−k+m when i−k≤0;
y=i+k when i+k≤m; and
y=i+k−m when i+k>m, wherein k is an integer greater than or equal to 0 and less than m, and wherein m elements in a same row in the matrix D correspond to different k values respectively.

5. The data processing method of claim 4, wherein a difference between k values corresponding to two adjacent elements of elements in each row in the matrix D is 1.

6. The data processing method of claim 4, further comprising:

receiving, by the decoding circuit, m demodulated data units using the m receive ports respectively, wherein the received m demodulated data units are in a one-to-one correspondence with the m receive ports, wherein the received m demodulated data units are received at a same time, and wherein a time at which the decoding circuit receives the received m demodulated data units is different from a time at which the decoding circuit receives m data units in any m×1 matrix of the m m×1 matrices in the matrix C; and sending, by the decoding circuit, the received m demodulated data units using the m transmit ports respectively, wherein the received m demodulated data units are in a one-to-one correspondence with the m transmit ports.

7. A data processing apparatus, comprising:

a receiver configured to receive m data streams using m receive ports respectively, wherein m is an integer greater than 1, wherein the m receive ports are in a one-to-one correspondence with the m data streams, wherein the m data streams comprise m×m data units, wherein each data stream of the m data streams comprises m data units, wherein the m×m data units form an m-order matrix A, wherein the m×m data units are m×m elements in the matrix A, wherein m 1×m matrices in the matrix A are in a one-to-one correspondence with the m data streams, wherein m elements located in a same m×1 matrix of m m×1 matrices in the matrix A are received at a same time, and wherein among m elements located in a same 1×m matrix of the m 1×m matrices in the matrix A, an element located on a right side is received earlier than an element located on a left side;

a processor coupled to the receiver and configured to keep a location of one element in each row in the matrix A received by the receiver unchanged and move remaining m−1 elements to remaining m−1 rows respectively in order to form an m-order matrix B, wherein a column number of each element in the remaining m−1 elements in the matrix A before the element is moved equals a column number of the element in the remaining m−1 elements in the matrix B after the element is moved, and wherein the m×m elements in the matrix A are in a one-to-one correspondence with m×m elements in the matrix B; and a transmitter coupled to the receiver and the processor and configured to send, using m transmit ports, the m×m elements in the matrix B generated by the processor to m different levels of a pulse amplitude modulation (PAM) circuit respectively to perform modulation, wherein m 1×m matrices in the matrix B are in a one-to-one correspondence with the m different levels of the PAM circuit, wherein m elements located in a same m×1 matrix of m m×1 matrices in the matrix B are sent at a same time, wherein among m elements located in a same 1×m matrix of the m 1×m matrices in the matrix B, an element located on a right side is sent earlier than an element located on a left side, wherein the m×m elements in the matrix A are denoted by $a_{ij}$, wherein the m×m elements in the matrix B are denoted by $b_{ij}$, wherein i=1, . . ., m, wherein j=1, . . ., m, wherein $b_{ij}=a_{xj}$, and wherein a value of x is:

x=i+k when i+k≤m;
x=i+k−m when i+k>m;
x=i−k when i−k>0; and
x=i−k+m when i−k≤0, wherein k is an integer greater than or equal to 0 and less than m, and wherein m elements in a same row in the matrix B correspond to different k values respectively.

8. The data processing apparatus of claim 7, wherein a difference between k values corresponding to two adjacent elements of elements in each row in the matrix B is 1.

9. The data processing apparatus of claim 7, wherein the receiver is further configured to receive the m data units using the m receive ports respectively, wherein the received m data units are in a one-to-one correspondence with the m receive ports, wherein the received m data units are received at a same time, wherein a time at which the receiver receives the received m data units is different from a time at which the receiver receives m data units in any m×1 matrix of the m m×1 matrices in the matrix A, wherein the transmitter is further configured to send, using the m transmit ports, the received m data units to the m different levels of the PAM circuit respectively to perform modulation, and wherein the received m data units are in a one-to-one correspondence with the m different levels of the PAM circuit.

10. A data processing apparatus, comprising:

a receiver configured to receive m demodulated data streams using m receive ports respectively, wherein m is an integer greater than 1, wherein the m receive ports are in a one-to-one correspondence with the m demodulated data streams, wherein the m demodulated data streams comprise m×m data units, wherein each data stream of the m demodulated data streams comprises m data units, wherein the m×m data units form an m-order matrix C, wherein the m×m data units are m×m elements in the matrix C, wherein m 1×m matrices in the matrix C are in a one-to-one correspondence with the m demodulated data streams, wherein m elements located in a same m×1 matrix of m m×1 matrices in the matrix C are received at a same time, and wherein among m elements located in a same 1×m matrix of the m 1×m matrices in the matrix C, an element located on a right side is received earlier than an element located on a left side;

a processor coupled to the receiver and configured to keep a location of one element in each row in the matrix C received by the receiver unchanged and move remaining m−1 elements to remaining m−1 rows respectively in order to form an m-order matrix D, wherein a column number of each element in the remaining m−1 elements in the matrix C before the element is moved equals a column number of the element in the remaining m−1 elements in the matrix D after the element is moved, and wherein the m×m elements in the matrix C are in a one-to-one correspondence with m×m elements in the matrix D; and a transmitter coupled to the receiver and the processor and configured to send, using m transmit ports, the m×m elements in the matrix D generated by the processor, wherein m elements located in a same m×1 matrix of m m×1 matrices in the matrix D are from the transmitter at a same time, wherein among m elements located in a same 1×m matrix of m 1×m matrices in the matrix D, an element located on a right side is sent earlier than an element located on a left side, wherein the m×m elements in the matrix C are denoted by $c_{ij}$, wherein the m×m elements in the matrix D are denoted by $d_{ij}$, wherein i=1, . . ., m, wherein j=1, . . ., m, wherein $d_{ij} = c_{yj}$, and wherein a value of y is:

y=i−k when i−k>0;
y=i−k+m when i−k≤0;
y=i+k when i+k≤m; and
y=i+k−m when i+k>m, wherein k is an integer greater than or equal to 0 and less than m, and wherein m elements in a same row in the matrix D correspond to different k values respectively.

11. The data processing apparatus of claim 10, wherein a difference between k values corresponding to two adjacent elements of elements in each row in the matrix D is 1.

12. The data processing apparatus of claim 10, wherein the receiver is further configured to receive m demodulated data units using the m receive ports respectively, wherein the received m demodulated data units are in a one-to-one correspondence with the m receive ports, wherein the received m demodulated data units are received at a same time, wherein a time at which the receiver receives the received m demodulated data units is different from a time at which the receiver receives m data units in any m×1 matrix of the m m×1 matrices in the matrix C, wherein the transmitter is further configured to send the received m demodulated data units using the m transmit ports respectively, and wherein the received m demodulated data units are in a one-to-one correspondence with the m transmit ports.

* * * * *

UNITED STATES PATENT AND TRADEMARK OFFICE
CERTIFICATE OF CORRECTION

PATENT NO.       : 10,320,602 B2
APPLICATION NO.  : 15/644350
DATED            : June 11, 2019
INVENTOR(S)      : Wenbin Yang et al.

Page 1 of 1

It is certified that error appears in the above-identified patent and that said Letters Patent is hereby corrected as shown below:

Claim 1, Column 22, Line 6: "m-elements" should read "m-1 elements"

Signed and Sealed this
Twentieth Day of August, 2019

Andrei Iancu
*Director of the United States Patent and Trademark Office*